(12) United States Patent
Fuentes (10) Patent No.: US 12,037,046 B2
(45) Date of Patent: Jul. 16, 2024

(54) HOOD RELEASE LEVER COVER ASSEMBLY FOR A VEHICLE

(71) Applicant: Nissan North America, Inc., Franklin, TN (US)

(72) Inventor: Bobby Fuentes, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 704 days.

(21) Appl. No.: 17/039,781

(22) Filed: Sep. 30, 2020

(65) Prior Publication Data

US 2022/0097775 A1 Mar. 31, 2022

(51) Int. Cl.
*B62D 25/12* (2006.01)
*E05B 83/24* (2014.01)

(52) U.S. Cl.
CPC ............ *B62D 25/12* (2013.01); *E05B 83/243* (2013.01)

(58) Field of Classification Search
CPC ....... B62D 25/12; E05B 83/243; E05B 83/24; E05B 85/10; E05B 13/001
See application file for complete search history.

(56) References Cited

U.S. PATENT DOCUMENTS

| 2002/0104400 A1* | 8/2002 | Hillgaertner | ............ E05B 83/24 |
| | | | 74/501.6 |
| 2019/0092273 A1* | 3/2019 | Miller | ..................... E05B 79/20 |

FOREIGN PATENT DOCUMENTS

| DE | 10047839 A1 | 4/2002 | |
| JP | H05112140 A | 5/1993 | |
| JP | 2 816 578 | * 12/2014 | ............... H01H 9/02 |

OTHER PUBLICATIONS

"www.ebay.com/itm/electrical-lockout-round-switch-lock-out-device-push-button-30mm-dia-home-loto-/182221011088", Sep. 30, 2020.

\* cited by examiner

*Primary Examiner* — Michael P Ferguson
*Assistant Examiner* — Thomas L Neubauer
(74) *Attorney, Agent, or Firm* — Global IP Counselors, LLP (57) ABSTRACT

A hood release lever cover assembly for a vehicle includes a first fixed member and a hood release lever cover. The first fixed member is configured to be connected to a vehicle body structure of the vehicle. The hood release lever cover is movably connected to the first fixed member. The hood release lever cover is movable between a first position preventing movement of a hood release lever of the vehicle and a second position allowing movement of the hood release lever.

14 Claims, 6 Drawing Sheets

HOOD RELEASE LEVER COVER ASSEMBLY FOR A VEHICLE

BACKGROUND

Field of the Invention

The present invention generally relates to a hood release lever cover assembly for a vehicle. More specifically, the present invention relates to a hood release lever cover assembly in which a hood release lever cover substantially prevents accidental movement of a hood release lever.

Background Information

A hood release lever for releasing a hood of a vehicle is disposed in a passenger compartment of a vehicle. The hood release lever is operated to release a hood of the vehicle.

SUMMARY

A need exists for a hood release lever cover assembly in which a hood release lever cover substantially prevents accidental movement of a hood release lever.

In view of the state of the known technology, one aspect of the present disclosure is to provide a hood release lever cover assembly for a vehicle including a first fixed member and a hood release lever cover. The first fixed member is configured to be connected to a vehicle body structure of the vehicle. The hood release lever cover is movably connected to the first fixed member. The hood release lever cover is movable between a first position preventing movement of a hood release lever of the vehicle and a second position allowing movement of the hood release lever.

Another aspect of the present invention is to provide a hood release lever cover assembly for a vehicle including a hood release lever and a hood release lever cover. The hood release lever is pivotally connected to a vehicle body structure of the vehicle. The hood release lever is movable between a first position and a second position. A hood of the vehicle is configured to be released when the hood release lever is moved to the second position. The hood release lever is pivotable about a first axis. The hood release lever cover is movably connected to vehicle body structure. The hood release lever cover is movable between a first position preventing movement of a hood release lever of the vehicle and a second position allowing movement of the hood release lever. The hood release lever cover is movable along a second axis. The second axis is substantially perpendicular to the first axis.

Also other objects, features, aspects and advantages of the disclosed hood release lever cover assembly for a vehicle will become apparent to those skilled in the art from the following detailed description, which, taken in conjunction with the annexed drawings, discloses exemplary embodiments of the hood release lever cover assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
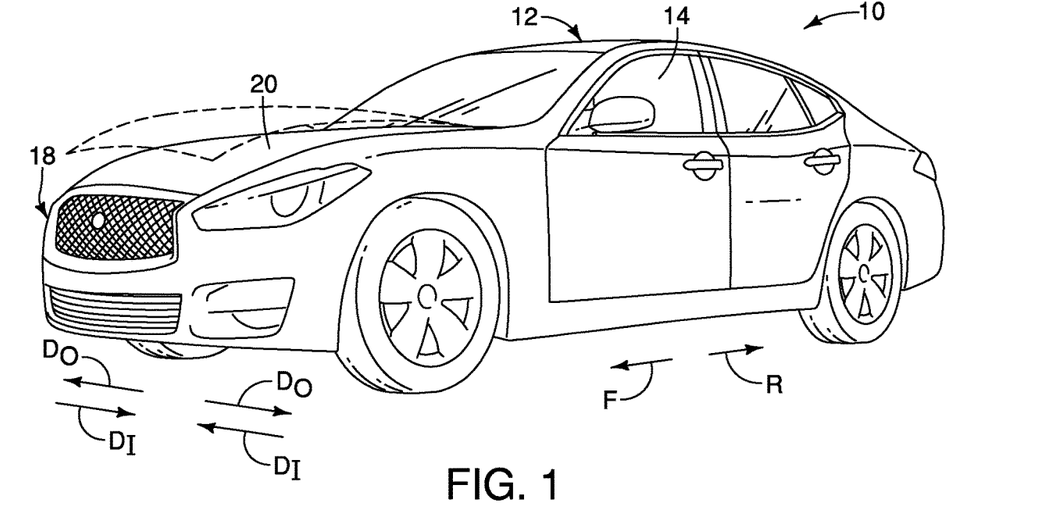
FIG. 1 is a perspective view of a vehicle including a hood release lever cover assembly in accordance with an exemplary embodiment of the present invention.
Figure 2:
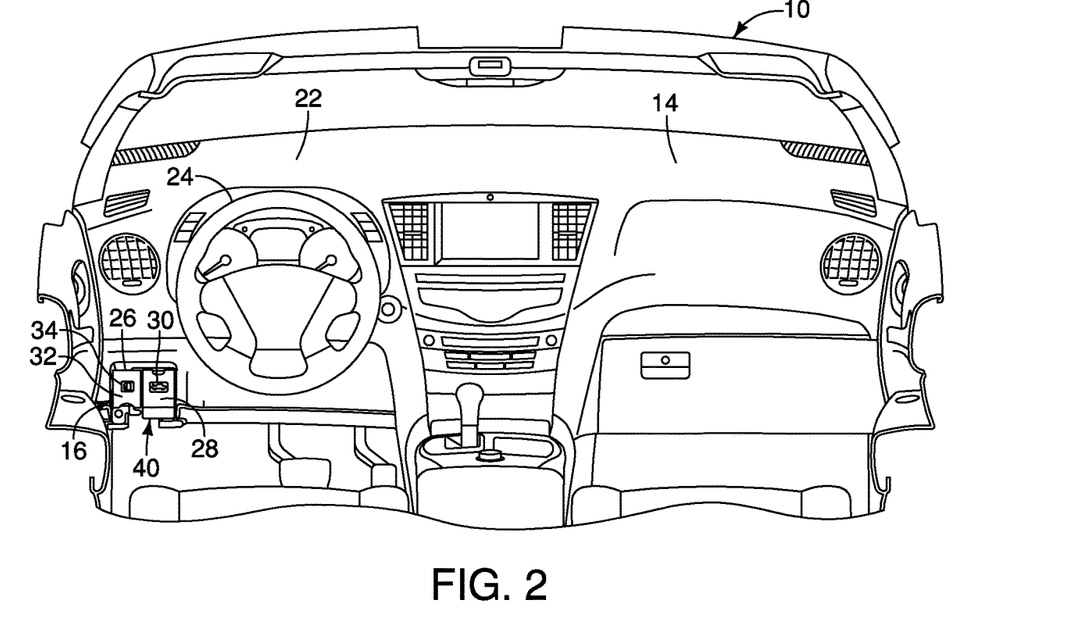
FIG. 2 is an elevational view of a dashboard of the vehicle of FIG. 1 including the hood release lever cover assembly.

Referring initially to FIGS. 1 and 2, a vehicle 10 is illustrated in accordance with an exemplary embodiment of the present invention. The vehicle 10 includes a vehicle body structure 12 that defines a vehicle interior 14 and includes a hood release lever cover assembly 16 disposed in the vehicle interior 14 of the vehicle 10. The vehicle interior 14 can be a passenger compartment within the vehicle 10. The vehicle body structure 12 includes, among other structures, a front-end structure 18 and a hood 20. The hood 20 is movably connected to the front-end structure 18 to be movable between a first, or closed position (shown in solid lines), and a second, or open, position (shown in dashed lines), as shown in FIG. 1.

As shown in FIG. 2, an instrument panel, or vehicle dashboard, 22 is located within the vehicle interior 14. A steering wheel 24 is connected to a steering column (not shown), which passes through the instrument panel 22.

The instrument panel 22 includes a recessed portion 26, as shown in FIGS. 2, 3, 5, 7 and 10, which includes a hood release lever 28. The recessed portion 26 is defined by an upper wall 26A, oppositely disposed side walls 26B and 26C and a rear wall 26D.

Figure 3:
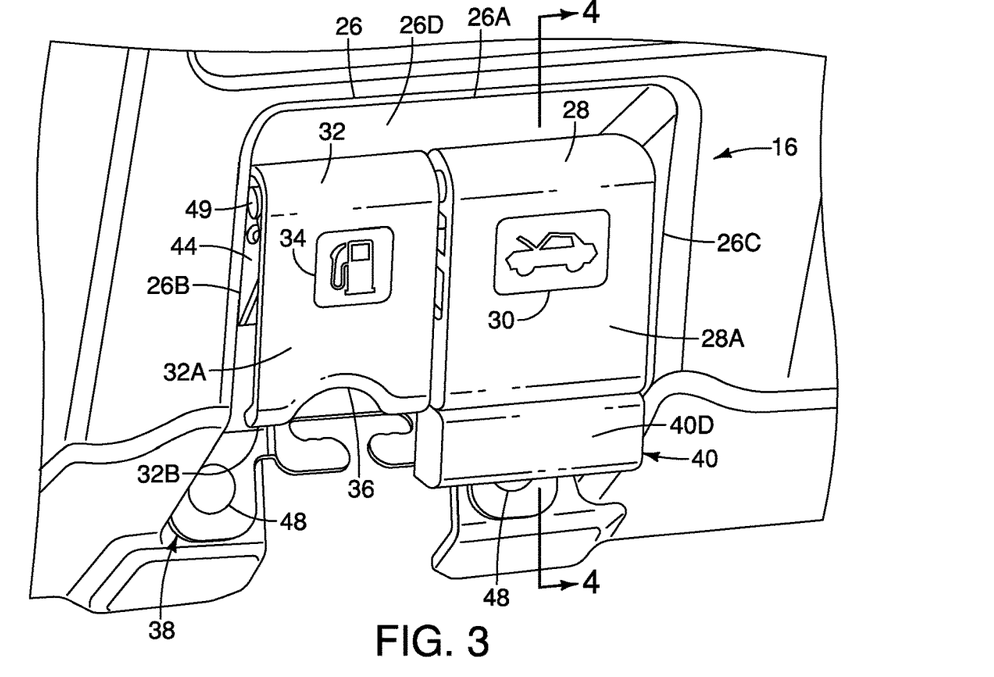
FIG. 3 is a perspective view of the hood release lever cover assembly of FIG. 2 in which the hood release lever cover and the hood release lever are in first positions.
Figure 4:
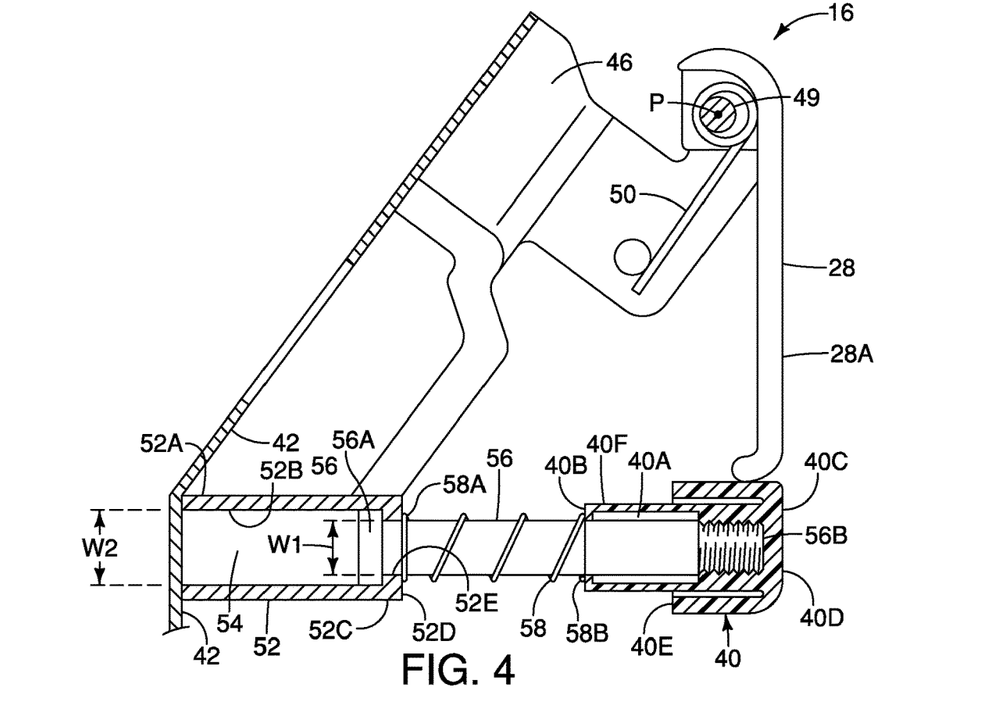
FIG. 4 is an elevational view in cross section of the hood release lever cover assembly of FIG. 3.
Figure 5:
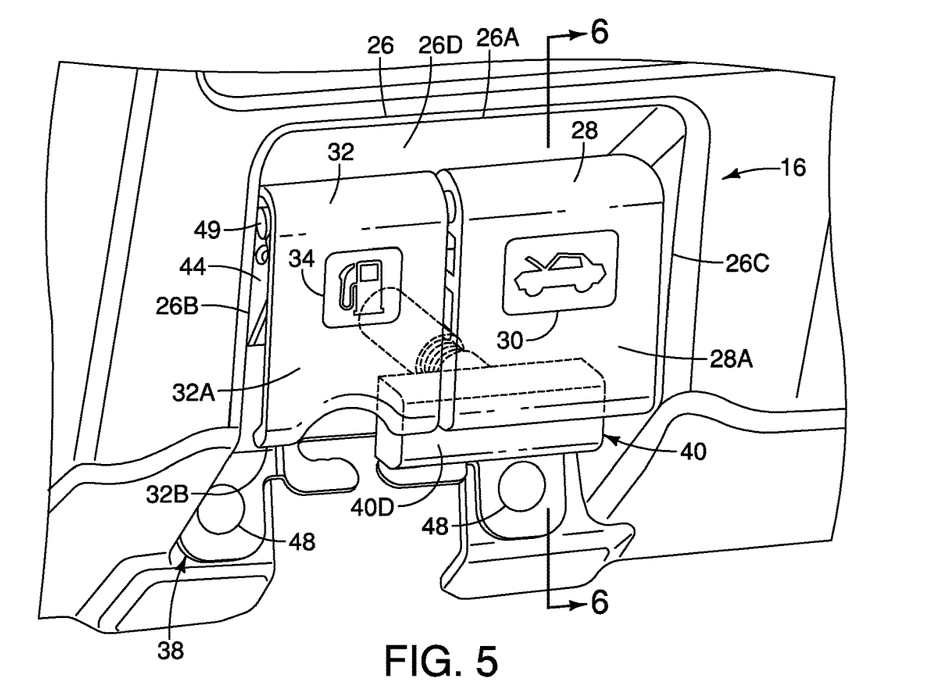
FIG. 5 is a perspective view of the hood release lever cover assembly of FIG. 3 in which the hood release lever cover is in a second position and the hood release is in a first position.
Figure 6:
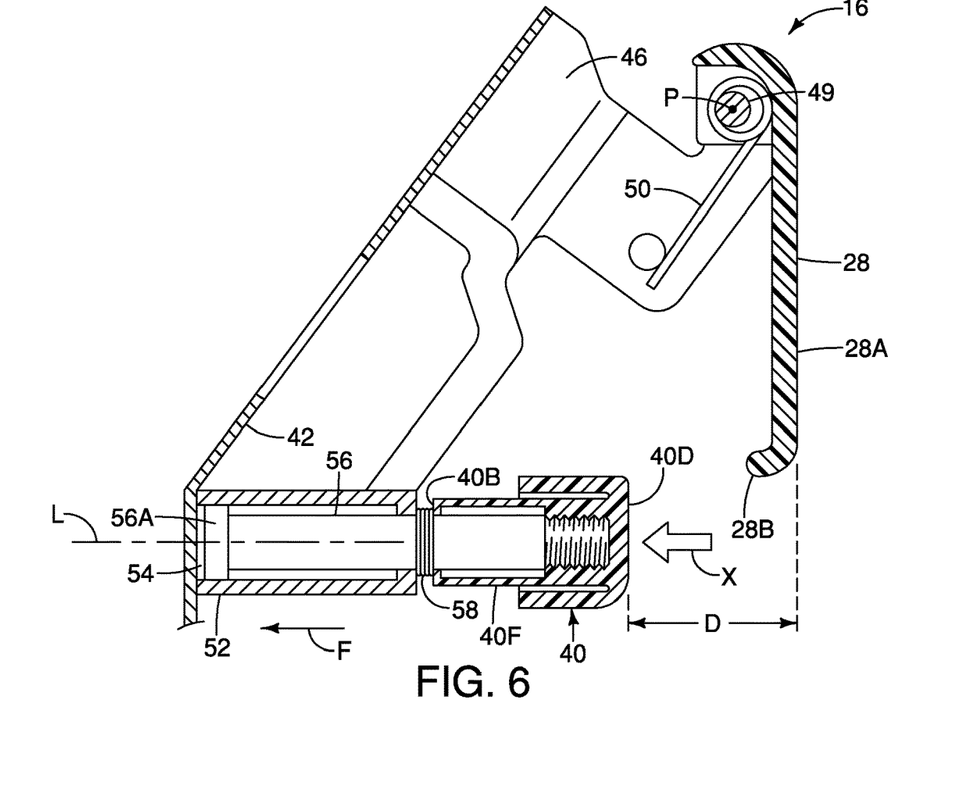
FIG. 6 is an elevational view in cross section of the hood release lever cover assembly of FIG. 5.
Figure 7:
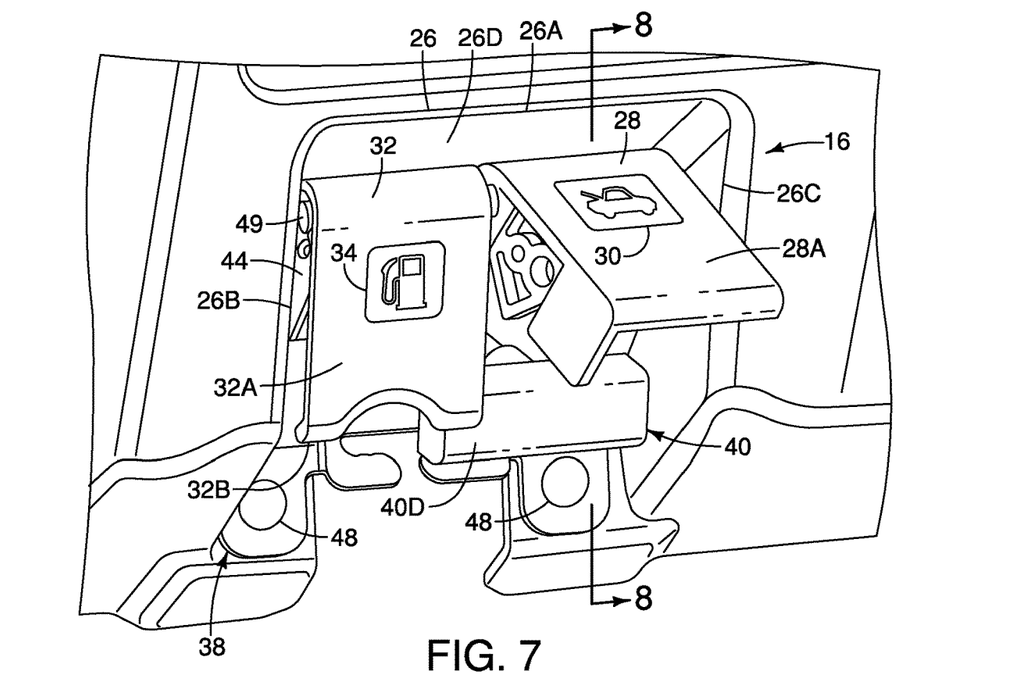
FIG. 7 is a perspective view of the hood release lever cover assembly of FIG. 3 in which the hood release lever cover and the hood release lever are in second positions.
Figure 8:
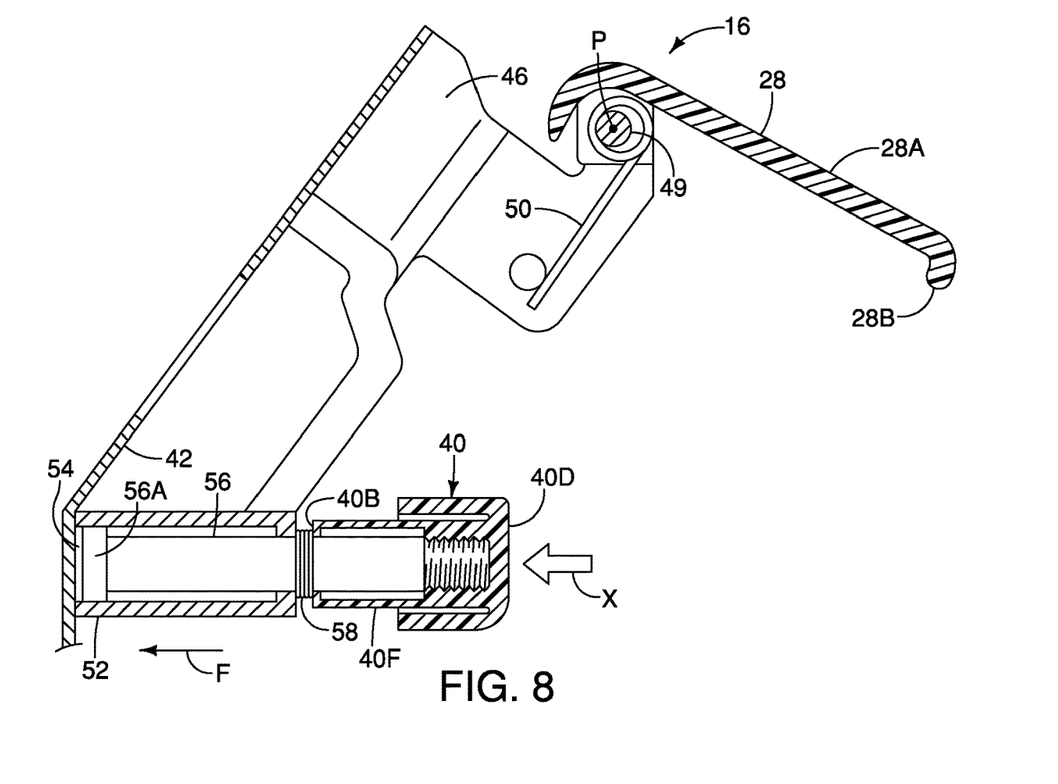
FIG. 8 is an elevational view in cross section of the hood release lever cover assembly of FIG. 7.

A hood release lever 28 is pivotally disposed in the recessed portion 26, as shown in FIGS. 2-8. The hood release lever 28 is pivotally connected to the instrument panel 22 of the vehicle body structure 12. The hood release lever 28 is movable between a first position, as shown in FIGS. 2-6, and a second position, as shown in FIGS. 7 and 8. Moving the hood release lever 28 from the first position to the second position releases the hood 20, as shown in FIG. 1. An icon 30 indicating a vehicle with a released hood is disposed on an outer surface 28A of the hood release lever 28, as shown in FIGS. 3 and 4.

A fuel tank door release lever 32 is movably disposed in the recessed portion 26 of the instrument panel 22, as shown in FIGS. 2, 3, 5 and 7. The fuel tank door release lever 32 is disposed adjacent the hood release lever 28. The fuel tank door release lever 32 is preferably disposed in a vehicle outboard direction DO (FIG. 1) of the hood release lever 28. In other words, the hood release lever 28 is disposed in a vehicle inboard (DI) direction of the fuel tank door release lever 32. The fuel tank door release lever 32 is laterally spaced from the hood release lever 28, as shown in FIGS. 2, 3 and 7 such that one of the hood release lever 28 and the fuel tank door release lever 32 can be operated without interfering with the other of the hood release lever 28 and the fuel tank door release lever 32. An icon 34 indicating a fuel pump is disposed on an outer surface 32A of the fuel tank door release lever 32. A recess 36 can be disposed in a lower edge 32B of the fuel tank door release lever 32, as shown in FIGS. 3 and 7, to facilitate moving the fuel tank door release lever 32 between the first and second positions.

The hood release lever cover assembly 16 includes a bracket assembly 38, a hood release lever cover 40, and the hood release lever 28, as shown in FIGS. 2-8 and 10. The hood release lever cover assembly 16 can further include the fuel tank door release lever 32. The bracket assembly 38 is configured to be connected to the recessed portion 26 of the instrument panel 22 of the vehicle body structure 12 of the vehicle 10. The hood release lever 28 is pivotally connected to the bracket assembly 38. The hood release lever 28 is movable between a first position, as shown in FIGS. 2-6, and a second position, as shown in FIGS. 7 and 8, in which the vehicle hood 20 (FIG. 1) is released. The hood release lever cover 40 is movably connected to the bracket assembly 38. The hood release lever cover 40 is movable between a first position, as shown in FIGS. 2-4, substantially preventing movement of the hood release lever 28 of the vehicle 10 and a second position, as shown in FIGS. 5-8, allowing movement of the hood release lever 28 from the first position to the second position.

Figure 10:
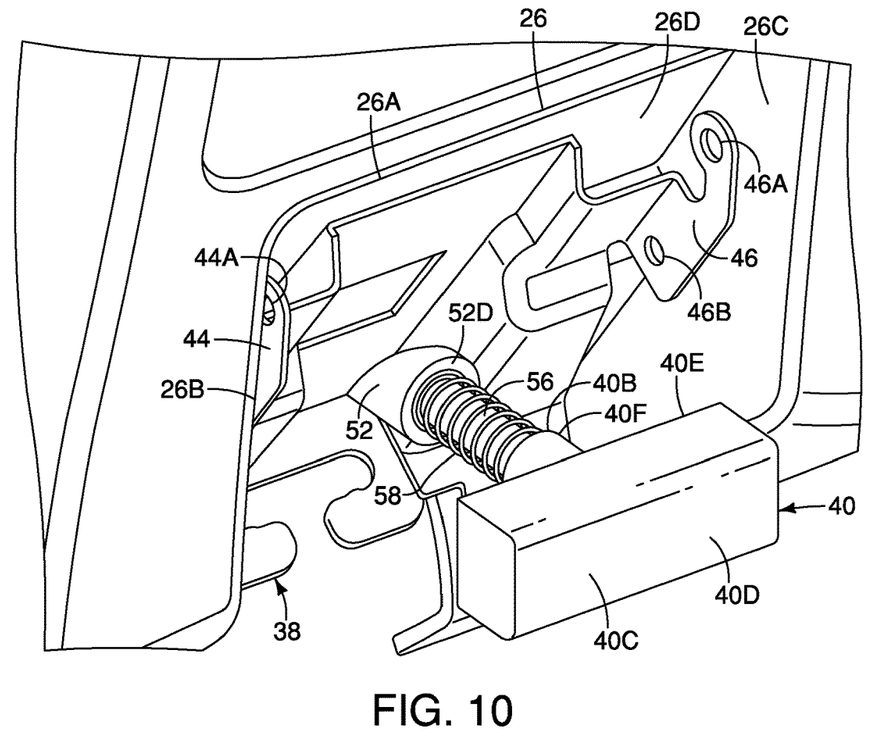
FIG. 10 is a perspective view of the hood release lever cover assembly of FIG. 3 in which the fuel tank door release and hood release levers are removed for clarity.

The bracket assembly 38 includes a mounting body 42 and first and second mounting tabs 44 and 46 extending outwardly from the mounting body 42, as shown in FIGS. 3, 5 and 10. The mounting body 42 has at least one fastener opening 48 configured to receive a fastener to secure the bracket assembly 38 to the rear wall 26D of the recessed portion 26 of the vehicle body structure 12 (FIG. 1). The mounting body 42 has two fastener openings 48, although any suitable number of fastener openings can be used. The first and second mounting tabs 44 and 46 extend outwardly from opposite edges of the mounting body 42. The bracket assembly 38 is preferably made of a metallic material, although any suitable material can be used. The bracket assembly 38 is preferably unitarily formed as a one-piece member.

The first and second mounting tabs 44 and 46 extend outwardly from the mounting body 42, as shown in FIGS. 3 and 5. The first mounting tab 44 has a first opening 44A disposed therein. The second mounting tab 46 has a first opening 46A disposed therein and aligned with the first opening 44A of the first mounting tab 44. The first mounting tab 44 has a second opening (not shown) disposed therein. The second mounting tab 46 has a second opening 46B disposed therein and aligned with the first opening of the first mounting tab 44.

A pin 49 is connected to the mounting body 42 of the bracket assembly 38, as shown in FIGS. 3, 4 and 8. The pin 49 is rigidly connected to the first and second mounting tabs 44 and 46 of the mounting body 42. The pin 49 is received by the first opening 44A in the first tab 44 and the second opening 46A in the second tab 46. The pin 49 is connected to the first and second mounting tabs 44 and 46 in any suitable manner, such as with fasteners or by welding or swaging. The hood release lever 28 and the fuel tank door release lever 32 are movably connected to the pin 49 to facilitate moving between the first and second positions. The hood release lever 28 and the fuel tank door release lever 32 can be connected to the pin 49 in any suitable manner to facilitate pivotal movement of the hood release lever 28 and the fuel tank door release lever 32, such as with a pair of mounting portions that receive the pin 49.

As shown in FIGS. 4 and 8, the hood release lever 28 is moved in a counter-clockwise direction from the first position to the second position, and a clockwise direction when moving the hood release lever 28 from the second position to the first position. The fuel tank door release lever 32 is similarly moved in a counter-clockwise direction from the first position to the second position, and a clockwise direction when moving the fuel tank door release lever 32 from the second position to the first position.

A biasing member 50, such as a torsion spring, is disposed on the pin 49 to bias the hood release lever 28 to the first position, as shown in FIGS. 4, 6 and 8. The biasing member 50 facilitates returning the hood release lever 28 to the first position (FIGS. 3 and 4) from the second position (FIGS. 7 and 8). The biasing member 50 has a first end connected to the hood release lever 28. A second end of the biasing member 50 is connected to the second opening 46B of the second mounting tab 46 of the mounting body 42 of the mounting bracket assembly 38. The fuel tank door release lever 32 is provided with a similar biasing member (not shown) disposed on the pin 49 to bias the fuel tank door release lever 32 to the first position. A first end of the biasing member for the fuel tank door release lever 32 is connected to the fuel tank door release lever 32 and a second end of the biasing member is connected to the second opening of the first mounting tab 44.

The hood release lever cover 40 is movably connected to the bracket assembly 38, which is connected to the recessed portion 26 of the vehicle body structure 12 (FIG. 1), as shown in FIGS. 4, 6, 8 and 10. A fixed member 52 is rigidly connected to the mounting body 42 of the bracket assembly 38. The hood release lever cover 40 is movably connected to the fixed member 52.

The fixed member 52 is preferably a hollow, cylindrical member, such as a rod, as shown in FIGS. 4, 6 and 8. A first end 52A of the fixed member 52 is rigidly connected to the mounting body 42 of the bracket assembly 38, as shown in FIGS. 4 and 10. An inner surface 52B of the fixed member 52 defines a bore 54. The bore 54 extends from the first end 52A to a second end 52C of the fixed member 52. A wall 52D extends axially inward at the second end 52C of the fixed member. An opening 52E is disposed in the wall 52D. A first width W1 of the opening 52E is less than a second width W2 of the bore 54, as shown in FIG. 4. The first end 52A of the fixed member 52 can be connected to the mounting body 42 in any suitable manner, such as by welding.

Figure 9:
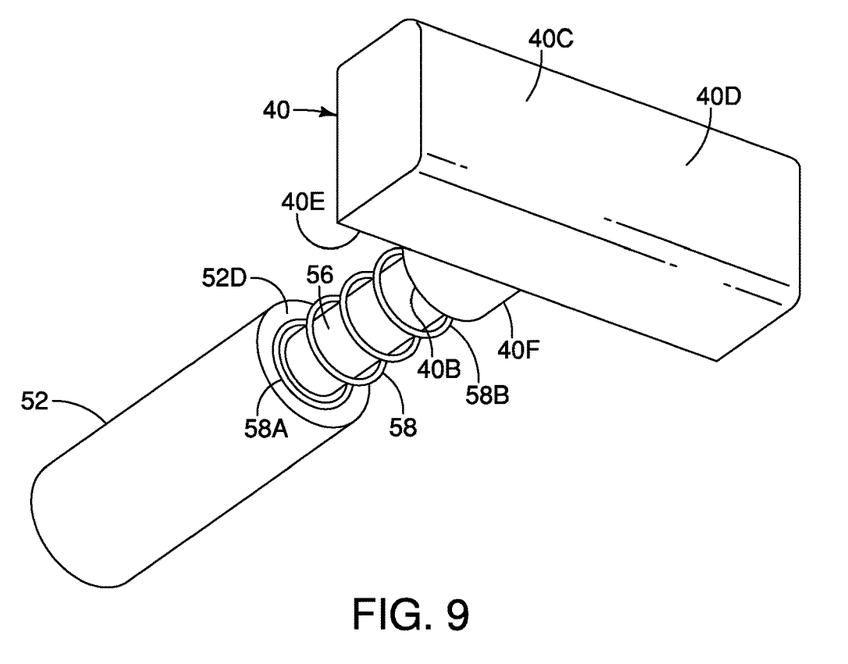
FIG. 9 is a perspective view of the hood release lever cover of FIG. 3.

A movable member 56 is movably disposed between the fixed member 52 and the hood release lever cover 40, as shown in FIGS. 4, 6 and 8. A first end 56A of the movable member 56 is movably disposed in the bore 54 of the fixed member 52. A width of the first end 56A of the fixed member 52 is larger than the first width W1 of the opening 52E in the fixed member 52 to prevent withdrawing the movable member 56 from the fixed member 52. A second end 56B of the movable member 56 receives the hood release lever cover 40 such that the second end 56B of the movable member 56 is fixedly attached to the hood release lever cover 40. The second end 56B of the movable member 56 can be connected to the hood release lever cover 40 in any suitable manner, such as by a threaded connection or with an adhesive. As shown in FIGS. 9 and 10, the movable member 56 is substantially centered on a rear surface 40E of the hood release lever cover 40.

The hood release lever cover 40 is fixedly attached to the movable member 56, as shown in FIGS. 4, 6 and 8. A bore 40A extends from the second end 40B of the hood release lever cover 40 toward a first end 40C such that the bore 40A does not extend completely through the hood release lever cover 40 to an outer surface 40D of the first end 40C. The bore 40A fixedly receives the second end 52B of the movable member 56. A post 40F extends outwardly from the rear surface 40E of the hood release lever cover 40, such that the second end 40B of the hood release lever cover 40 is at the end of the post 40F. The bore 40A extends through the post 40F to the first end 40C of the hood release lever cover 40.

A biasing member 58 is disposed on an outer surface of the movable member 56, as shown in FIGS. 4, 6 and 8-10. A first end 58A of the biasing member 58 engages the wall 52D at the second end 52C of the fixed member 52. A second end 58B of the biasing member 58 engages the second end 40B of the hood release lever cover 40. The wall 52D of the fixed member 52 and the second end 40B of the hood release lever cover 40 are engagement members with respect to the biasing member 58 to allow compression of the biasing member 58 upon movement of the hood release lever cover 40 from the first position (FIG. 4) toward the second position (FIGS. 6 and 8). The biasing member 58 biases the hood release lever cover 40 to the first position, as shown in FIG. 4. The biasing member 58 can be any suitable member to bias the hood release lever cover 40 in the first position, as shown in FIG. 4, such as a compression spring.

An outer surface 40D of the hood release lever cover 40 defines an engagement surface at the first end 40C of the hood release lever cover 40, as shown in FIG. 4. The outer, or engagement, surface 40D of the hood release lever cover 40 is preferably substantially flush with the outer surface 28A of the hood release lever 28 when the hood release lever 28 is in the first position and the hood release lever cover 40 is in the first position.

The hood release lever cover assembly 16 is disposed in the recessed portion 26 of the instrument panel 22 of the vehicle body structure 12, as shown in FIGS. 2 and 3. The mounting body 42 of the bracket assembly 38 is connected to the rear wall 26D of the recessed portion 26. The at least one fastener opening 48 of the mounting body 42 receives a fastener to secure the hood release lever cover assembly 16 to the recessed portion 26. When the hood release lever cover assembly 16 is connected to the recessed portion 26, the hood release lever cover 40 is disposed beneath the hood release lever 28 when the hood release lever cover 40 is disposed in the first position, as shown in FIGS. 3 and 4, to substantially prevent movement of the hood release lever 28 from the first position to the second position. The hood release lever cover 40 is disposed adjacent the hood release lever 28 such that the hood release lever 28 is substantially inaccessible, thereby substantially preventing movement of the hood release lever 28 from the first position to the second position.

The hood release lever cover 40, in the first position, is disposed on a vehicle inboard (DI, FIG. 1) side of the fuel tank door release lever 32 in the first position, as shown in FIGS. 2 and 3, such that access to the fuel tank door release lever 32 is not prevented by the hood release lever cover 40. The fuel tank door release lever 32 can be moved to the second position when the hood release lever cover 40 is in the first position to release the fuel tank door.

To open the hood 20 of the vehicle 10, the hood release lever cover 40 is moved from the first position, as shown in FIGS. 2-4, to the second position, as shown in FIGS. 5 and 6. The engagement surface 40D of the hood release lever cover 40 is pushed inwardly (in a vehicle forward direction F as shown in FIG. 6) in a linear direction along a longitudinal axis L of the fixed member 52. When the force X (FIG. 6) exerted on the engagement surface 40D of the hood release lever cover 40 overcomes the spring resistance, the hood release lever cover 40 is moved in the forward direction. The movable member 56 is fixed to the hood release lever cover 40 such that movement of the hood release lever cover 40 moves the movable member 56 in the same linear direction. The first end 56A of the movable member 56 moves through the bore 54 of the fixed member 52. The biasing member 58 is compressed between the wall 52D of the fixed member 52 and the second end 40B of the hood release lever cover 40. As shown in FIG. 6, a stroke distance D of the hood release lever cover 40 is the linear distance between the engagement surface 40D in the first position and the engagement surface 40D in the second position. The stroke distance D can be any suitable distance to provide access to the hood release lever cover 40, but is preferably between approximately 16 and 20 mm, inclusive.

The engagement surface 40D of the hood release lever cover 40 is disposed in a vehicle forward direction of the outer surface 28A of the hood release lever 28 when the hood release lever cover 40 is in the second position and the hood release lever 28 is in the first position, as shown in FIG. 6. When the hood release lever cover 40 is disposed in the second position, the lower edge 28 of the hood release cover 28 is accessible such that the hood release lever 28 can be moved from the first position to the second position.

When the hood release lever cover 40 is maintained in the second position, as shown in FIGS. 5 and 6, the hood release lever 28 can then be moved from the first position to the second position, as shown in FIGS. 7 and 8. The hood release lever cover 40 is maintained in the second position by maintaining the force X on the hood release lever cover 40. The hood release lever 28 pivots about a pivot axis P when moving between the first and second positions. When the hood release lever 28 is moved to the second position, the hood 20 is moved to the released position shown in dashed lines in FIG. 1. The hood release lever cover 40 is maintained in the second position when moving the hood release lever 28 from the first position to the second position, as shown in FIGS. 7 and 8. The hood release lever 28 pivots in the counter-clockwise direction when moving from the first position to the second position. The hood release lever cover 40 moves linearly along the longitudinal axis L of the fixed member 52 when moving the hood release lever cover 40 between the first and second positions. The pivot axis P and the longitudinal axis L are substantially perpendicular, as shown in FIGS. 6 and 8. When the hood 20 is released, the hood release lever 28 is released and the biasing member 50 returns the hood release lever 28 to the first position. The hood release lever 28 pivots in the clockwise direction when moving from the second position to the first position. The hood release lever cover 40 can then be released, and the biasing member 58 returns the hood release lever cover 40 to the first position.

Operation of both the hood release lever cover 40 and the hood release lever 28 is a two-step process, thereby further substantially preventing accidental operation of the hood release lever 28. In the first step, the hood release lever cover 40 is moved linearly along a longitudinal axis L such that the hood release lever 28 can be accessed and moved. In the second step, the hood release lever 28 is pivotally moved about the pivot axis P of the pin 49 to release the hood 20. The two-step process likely requires a separate hand for each step, thereby substantially preventing accidental operation of the hood release lever 28.

Figure 11:
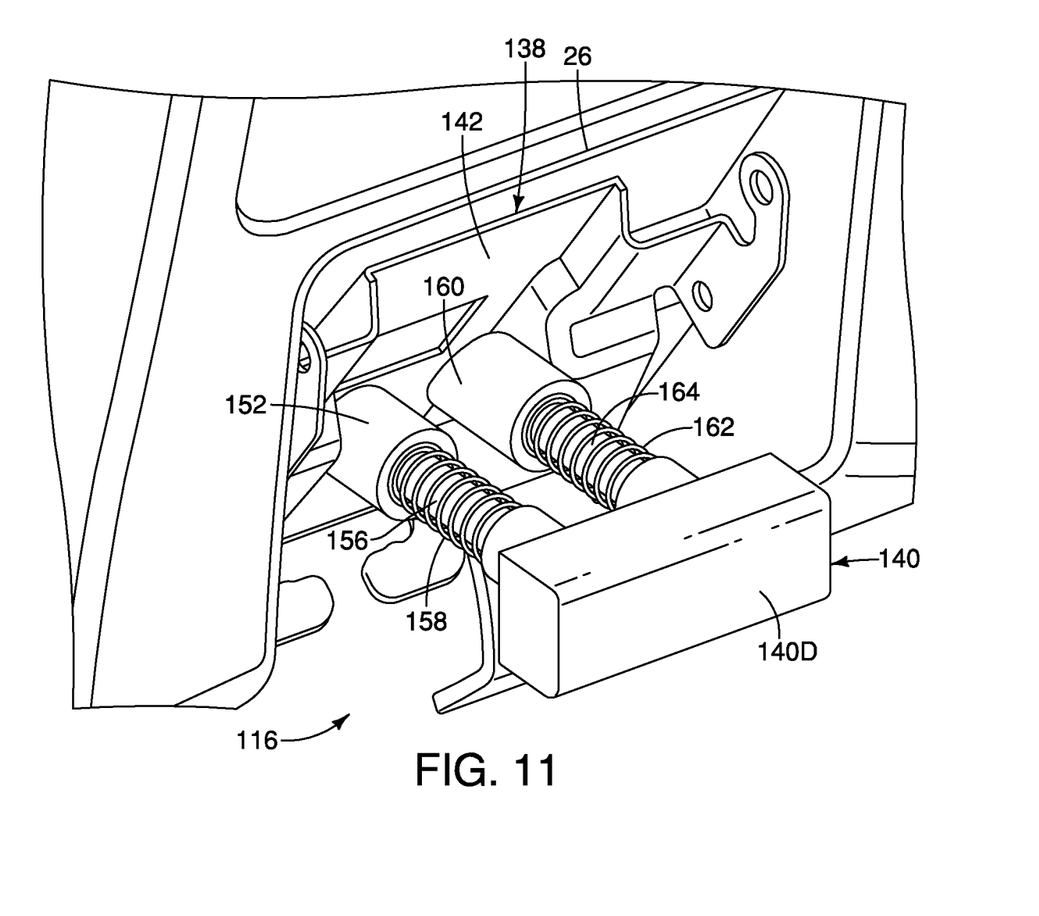
FIG. 11 is a perspective view of a hood release lever cover assembly in accordance with another exemplary embodiment of the present invention.

As shown in FIG. 11, a hood release lever cover assembly 116 in accordance with another illustrated exemplary embodiment of the present invention is substantially similar to the hood release lever cover assembly 16 of the exemplary embodiment illustrated in FIGS. 1 to 10 except for the differences described below. Similar parts are identified with similar reference numerals, except increased by 100 (i.e., 1xx, accordingly).

The hood release lever cover assembly 116 is substantially similar to the hood release lever cover assembly 16 of the hood release lever cover assembly 16 except that a second fixed member 160 and a second movable member 164 extending between the hood release lever cover 140 and the mounting body 142 of the bracket assembly 138. A second biasing member 162 is disposed on the second movable member 164 to be compressed between the hood release lever cover 140 and the second fixed member 160.

The second fixed member 160 is configured substantially similarly to the first fixed member 152. The second movable member 164 is configured substantially similarly to the first movable member 156. The second fixed member 160 is substantially parallel to the first fixed member 152. The second movable member 164 is substantially parallel to the first movable member 156. The second biasing member 162 is configured substantially similarly to the first biasing member 158. The first and second movable members 156 and 164 are preferably connected to the hood release lever cover 140 to be evenly spaced with respect to a width of the hood release lever cover 140.

To open the hood 20 of the vehicle 10 (FIG. 1), the hood release lever cover 140 is moved from the first position, as shown in FIG. 11, to the second position (FIGS. 5 and 6). The engagement surface 140D of the hood release lever cover 40 is pushed inwardly (in a vehicle forward direction F as shown in FIG. 1) along a longitudinal axis L (FIG. 4). When the force exerted on the engagement surface 140D of the hood release lever cover 40 overcomes the spring resistance of the first and second biasing members 158 and 162, the hood release lever cover 140 is moved in the forward direction. The first and second movable members 156 and 164 are fixed to the hood release lever cover 140 such that movement of the hood release lever cover 140 moves the first and second movable members 156 and 164 in the same linear direction. The first and second biasing members 158 and 162 are compressed between the first and second fixed members 152 and 160, respectively, and the of the hood release lever cover 140. Operation of the hood release lever 28 to the second position is substantially similar as described with respect to the exemplary embodiment of FIGS. 1-10.

The second fixed member 160, the second movable member 164 and the second biasing member 162 disposed between the hood release lever cover 140 and the mounting body 142 of the bracket assembly 138 provide a more robust and rigid hood release lever cover assembly 116. The hood release lever cover 140 is substantially prevented from non-linear movement with a pair of fixed members 152 and 160, movable members 156 and 164, and biasing members 158 and 162 disposed between the hood release lever cover 140 and the bracket assembly 138.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the hood release lever cover assembly. Accordingly, these terms, as utilized to describe the present invention should be interpreted relative to a vehicle equipped with the hood release lever cover assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hood release lever cover assembly for a vehicle, the hood release lever cover assembly comprising:
  a hood release lever pivotally connected to a vehicle body structure of the vehicle, the hood release lever being movable between a first position and a second position, a hood of the vehicle being configured to be released when the hood release lever is moved to the second position, the hood release lever being pivotable about a first axis;

a first fixed member configured to be connected to the vehicle body structure of the vehicle, a bore being disposed in the first fixed member; and a hood release lever cover linearly movably connected to the first fixed member, the hood release lever cover being linearly movable between a first position preventing access to the hood release lever of the vehicle to prevent movement of the hood release lever and a second position allowing access to the hood release lever to allow movement of the hood release lever;

a first movable member disposed between the first fixed member and the hood release lever cover, a first end for the first movable member being received within the bore of the first fixed member, and a second end of the first movable member being coupled to the hood release lever cover; and a biasing member biasing the hood release lever cover to the first position, a first end of the biasing member engaging the first fixed member and a second end of the biasing member engaging the hood release lever cover to bias the hood release lever cover to the first position, the hood release cover being linearly movable along a longitudinal axis of the bore of the first fixed member between the first and second positions.

2. The hood release lever cover assembly according to claim 1, wherein
the hood release lever cover is fixedly attached to the first movable member.

3. The hood release lever cover assembly according to claim 1, wherein
the first end of the first movable member moves within the bore of the first fixed member upon the hood release lever cover moving from the first position to the second position.

4. The hood release lever cover assembly according to claim 1, wherein
a second fixed member is configured to be connected to the vehicle body structure, and
a second movable member is disposed between the second fixed member and the hood release lever cover, the first and second movable members being movable with respect to the respective first and second fixed members upon the hood release lever cover moving between the first and second positions.

5. A hood release lever cover assembly for a vehicle, the hood release lever cover assembly comprising:
a hood release lever pivotally connected to a vehicle body structure of the vehicle, the hood release lever being movable between a first position and a second position, a hood of the vehicle being configured to be released when the hood release lever is moved to the second position, the hood release lever being pivotable about a first axis; and
a hood release lever cover linearly movably connected to vehicle body structure, the hood release lever cover being movable between a first position preventing access to a hood release lever of the vehicle to prevent movement of the hood release lever and a second position allowing access to the hood release lever to allow movement of the hood release lever, the hood release lever cover being linearly movable along a second axis, the second axis being substantially perpendicular to the first axis.

6. The hood release cover assembly according to claim 5, wherein
a surface of the hood release lever is substantially flush with a surface of the hood release lever cover when the hood release lever is in the first position and the hood release lever cover is in the first position.

7. The hood release cover assembly according to claim 6, wherein
the surface of the hood release lever cover is disposed in a vehicle forward direction of the surface of the hood release lever when the hood release lever cover is in the second position and the hood release lever is in the first position.

8. The hood release cover assembly according to claim 5, wherein
a first fixed member is connected to the vehicle body structure of the vehicle, the hood release lever cover being movably connected to the first fixed member.

9. The hood release cover assembly according to claim 8, wherein
the second axis is a longitudinal axis of the first fixed member.

10. The hood release cover assembly according to claim 8, wherein
a first movable member is disposed between the first fixed member and the hood release lever cover.

11. The hood release cover assembly according to claim 10, wherein
a first end of the first movable member is received in a bore of the first fixed member, and a second end of the first movable member is fixedly attached to the hood release lever cover.

12. The hood release cover assembly according to claim 11, wherein
a biasing member biases the hood release lever cover to the first position.

13. The hood release cover assembly according to claim 12, wherein
a first end of a biasing member engages the first fixed member and a second end of the biasing member engages the first movable member to bias the hood release lever cover to the first position.

14. The hood release cover assembly according to claim 10, wherein
a second fixed member is connected to the vehicle body structure, and
a second movable member is disposed between the second fixed member and the hood release lever cover, the first and second movable members being movable with respect to the respective first and second fixed members upon the hood release lever cover moving between the first and second positions.

* * * * *